(12) United States Patent
Turano et al.

(10) Patent No.: US 11,183,047 B2
(45) Date of Patent: Nov. 23, 2021

(54) IDENTIFYING AND CONTAINING CONTAMINANTS USING IOT DEVICES

(71) Applicant: International Business Machines Corporation, Armonk, NY (US)

(72) Inventors: Mark Turano, Cedar Grove, NJ (US); Robert Huntington Grant, Atlanta, GA (US); Sarbajit K. Rakshit, Kolkata (IN); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/686,628

(22) Filed: Nov. 18, 2019

(65) Prior Publication Data
US 2021/0150874 A1 May 20, 2021

(51) Int. Cl.
| | |
|---|---|
| G08B 21/12 | (2006.01) |
| G06T 11/00 | (2006.01) |
| H04L 29/08 | (2006.01) |
| H04L 12/28 | (2006.01) |
| G08B 3/10 | (2006.01) |
| G06K 9/00 | (2006.01) |

(52) U.S. Cl.
CPC ............. *G08B 21/12* (2013.01); *G06T 11/00* (2013.01); *G08B 3/10* (2013.01); *H04L 12/2829* (2013.01); *H04L 67/12* (2013.01); *H04L 67/22* (2013.01); *H04L 67/306* (2013.01); *G06K 9/00335* (2013.01); *G06K 9/00711* (2013.01); *G06K 2009/00738* (2013.01)

(58) Field of Classification Search
None
See application file for complete search history.

(56) References Cited

U.S. PATENT DOCUMENTS 7,383,129 B1    6/2008  Baillot
2012/0150333 A1*  6/2012  De Luca ............ G06K 9/00281
                                                  700/109

(Continued)

FOREIGN PATENT DOCUMENTS

KR    1020160116715 A    10/2016
WO       2019038271 A1    2/2019

OTHER PUBLICATIONS

"IBM Research—Computer Vision and Augmented Reality", printed on Sep. 9, 2019, 19 pages, <https://www.research.ibm.com/haifa/dept/imt/ist_dm_activities.shtml>.

(Continued)

*Primary Examiner* — Frank S Chen
(74) *Attorney, Agent, or Firm* — Joseph P. Curcuru (57) ABSTRACT

Embodiments of the present invention describe identifying and containing contaminants using, IoT devices. Embodiments describe, identifying objects and user activity in a designated area through a plurality of internet of things (IoT) devices and a plurality of IoT sensors, determining a contamination risk in the designated area, and generating an augmented reality contamination path for the contamination risk based on the identified objects and user activity in the designated area. Additionally, embodiments describe, displaying an augmented reality contamination path to a user on an augmented reality device, and activating an IoT containment device to contain the contamination risk.

20 Claims, 3 Drawing Sheets

(56) References Cited

U.S. PATENT DOCUMENTS

| | | |
|---|---|---|
| 2015/0118668 A1 | 4/2015 | Mayou |
| 2015/0332529 A1 | 11/2015 | Wong |
| 2016/0184469 A1 | 6/2016 | Welch |
| 2017/0213079 A1 | 7/2017 | Herger |
| 2017/0278034 A1* | 9/2017 | Kodeswaran ........... H04L 67/18 |
| 2018/0068179 A1 | 3/2018 | Derenne |
| 2018/0182167 A1 | 6/2018 | Lim |
| 2020/0021601 A1* | 1/2020 | Aurongzeb ........... H04L 63/105 |
| 2020/0168339 A1* | 5/2020 | Correnti ................. G16H 40/67 |
| 2020/0191726 A1* | 6/2020 | Waanders .............. G01N 21/94 |
| 2020/0225313 A1* | 7/2020 | Coles ................... G08B 25/006 |
| 2020/0334907 A1* | 10/2020 | Bender ............... G06F 3/04815 |

OTHER PUBLICATIONS

Best, Jo, "AI that knows you're sick before you do: IBM's five-year plan to remake healthcare", Feb. 1, 2017, 18 pages, <https://www.zdnet.com/article/ai-that-knows-youre-sick-before-you-do-ibms-five-year-plan-to-remake-healthcare/>.

Chang et al., "Big Data and Healthcare: Building an Augmented World", printed on May 7, 2019, 5 pages, <https://synapse.koreamed.org/search.php?where=aview&id=10.4258/hir.2016.22.3.153&code=1088HIR&vmode=FULL>.

* cited by examiner

IDENTIFYING AND CONTAINING CONTAMINANTS USING IOT DEVICES

BACKGROUND OF THE INVENTION

The present invention relates generally to the field of Internet of Things (IoT), and more particularly to identifying and predicting contamination paths using IoT devices and augmented reality.

The internet of Things (IoT) is a system of interrelated computing devices, mechanical and digital machines, objects, animals or people that are provided with unique identifiers (UIDs) and the ability to transfer data over a network without requiring human-to-human or human-to-computer interaction. The definition of the Internet of Things has evolved due to the convergence of multiple technologies, real-time analytics, machine learning, commodity sensors, and embedded systems. Traditional fields of embedded systems such as wireless sensor networks, control systems, and automation (including home and building automation) all contribute to enabling the IoT.

In the consumer market, IoT technology is most synonymous with products pertaining to the concept of smart home covering devices and appliances (e.g., lighting fixtures, thermostats, home security systems and cameras, and other home appliances) that support one or more common ecosystems, and can be controlled via devices associated with that ecosystem, such as smartphones and smart speakers. A contamination is the presence of a constituent, impurity, or some other undesirable element that soils, corrupts, infects, makes unfit, or makes an inferior natural environment or workplace. Within the sciences, the word "contamination" can take on a variety of subtle differences in its meaning (e.g., whether the contaminant is a solid or a liquid, as well as the variance of environment the contaminant is found in). A contaminant may even be more abstract, as in the case of an unwanted energy source that may interfere with a process.

SUMMARY

Embodiments of the present invention disclose a method, a computer program product, and a system for identifying and containing contaminants using IoT devices, the embodiments comprise: identifying objects and user activity in a designated area through a plurality of internet of things (IoT) devices and a plurality of IoT sensors; determining a contamination risk in the designated area; generating an augmented reality contamination path for the contamination risk based on the identified objects and user activity in the designated area; displaying an augmented reality contamination path to a user on an augmented reality device; and activating an IoT containment device to contain the contamination risk.

DETAILED DESCRIPTION

Contamination can spread through wind flow, touch, flowing water, shared physical objects like a computer, work equipment, or shoes. The type of contamination is important to understand how the contamination can spread (e.g., some contaminants propagate through the air and some propagate through touch). For example, if a first user touches a contaminated area and then touches a non-contaminated area, then the later touched area will also be contaminated. Continuing this example, if a second user touches the same contaminated area then the contamination will propagate to any other surface the first user and second user touch. A contaminated area can be any large surface area or object known in the art (e.g., a room, hallway, large machine, or building) or a small surface area or object known in the art (e.g., a corner of the room, a spot on a counter, a doorknob, or a button). While a user is in a designated area the user can touch various objects and spread a contamination if proper contamination containment steps are not taken. Additionally, contaminations can spread through cloths and/or shoes (e.g., footsteps on the floor, so proper containment efforts must take place). There is an opportunity to use augmented reality glass to visualize how the user has spread a contamination and predict the contamination propagation.

Embodiments of the present invention can observe and/or record a user's activity in a designated area through IoT devices and sensors. Embodiments of the present invention can create a user profile or historic record of a user-specific activity pattern and/or user-specific habits based on the collected user activity received from the IoT devices and sensors (collectively referred to as learned user activity patterns). Embodiments of the present invention, via IoT devices and sensors, can record and learn a user's sequence of touching different objects in certain contextual situations. For example, embodiments of the present invention can identify that a particular user is in a work situation and predict the user's sequence of activity during a known contextual situation. Embodiments of the present invention can predict the propagation path and rate/speed of contamination propagation, via a machine learning technique. Embodiments of the present invention can enable IoT devices and IoT sensors to track a user's movement pattern within a designated area (e.g., log that a user has turned on the lights, walked over to the sink and turned it on), wherein embodiments of the present invention can interact with contamination containment devices to prevent the spreading of the contamination. For example, embodiments of the present invention identify that a particular user has entered a laboratory and has tracked in a contaminant through the user's shoes. In this example, embodiments of the present invention issues a notification to the user through an IoT enabled device (e.g., an alert or siren through an IoT speaker or sending a text alert to the users smart phone) and activates a smart vacuum to contain the identified contaminant.

Embodiments of the present invention can visually display, through augmented reality, the area(s) or object(s) that are contaminated by a user and the potential area(s) and object(s) that are prone to contamination propagation based on learned user-specific activity patterns. Using predefined rules, embodiment of the present invention can identify contamination entry points in a designated area (e.g., a smart home, laboratory, or a workplace) and can proactively alert the user to take proper containment steps in order to stop contamination spreading at an early stage. Embodiments of the present invention, via artificial intelligence and an augmented reality system, can highlight the areas and/or objects in the designated area which are already contaminated (e.g., the objects are touched by the user or other users before any containment action has been taken, and the said area or objects that are not de-contaminated), so that user can avoid touching the contaminated areas in order to prevent the contamination spreading. Embodiments of the present invention enable a user to define contamination free objects and/or areas. Upon identifying that the user has not taken any containment actions before touching a contamination free object and/or entering into a contamination free area, an alert is issued to the user with instructions to take proper containment steps before touching the designated objects or entering into the designated area.

It should be noted that a containment step(s) or containment actions can be any action taken by a user or IoT device to remove the contamination and/or stop contamination propagation.

It should be noted that a designated area can encompass a workspace, a laboratory, a building, a warehouse, a vehicle, a room, a house, a clean room, and/or any other location a person can live, work, and/or perform tasks.

It should be noted that IoT devices can be a camera, a smart faucet, smart lights, and/or any IoT device that is known in the art It should be noted that an IoT sensor can be a temperature sensor, a proximity sensor, a pressure sensor, a motion sensor, water quality sensor, a chemical sensor, a gas sensor, a smoke sensor, an infrared sensor, an image sensor, a level sensor, humidity sensor, an optical sensor, and/or any other IoT sensor known in the art It should be noted herein that in the described embodiments, participating parties (i.e., users) have consented to having their images taken, uploaded, and saved and being recorded and monitored. Additionally, participating parties are aware of the potential that such recording, tracking, and monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 3).

Figure 1:
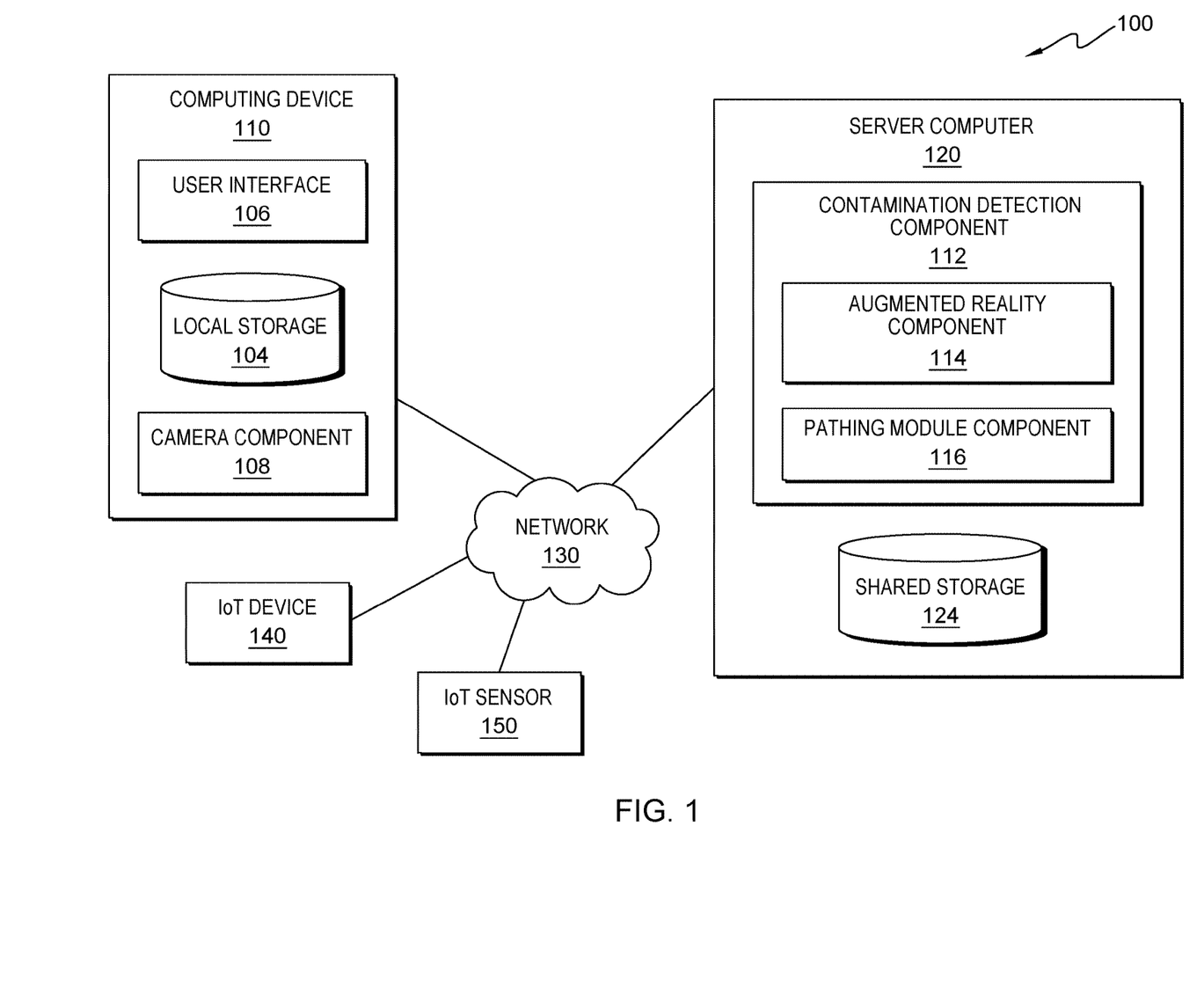
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110 and server computer 120, and any other computing devices and/or storage devices (not shown in FIG. 1) within distributed data processing environment 100.

IoT device 140 can be a camera, a smart faucet, smart lights, and/or any IoT device that is known in the art. In the depicted embodiments, IoT device 140 is a standalone device. Alternatively, IoT device 140 can execute anywhere within distributed data processing environment 100 as long as IoT device 140 can communicate with server computer 120, contamination detection component 112, IoT sensor 150, and/or computing device 110, via network 130. In various embodiments, not depicted in FIG. 1, distributed data processing environment 100 can comprise a plurality of IoT device 140.

IoT sensor 150 can be a temperature sensor, a proximity sensor, a pressure sensor, a motion sensor, water quality sensor, a chemical sensor, a gas sensor, a smoke sensor, an infrared sensor, an image sensor, a level sensor, humidity sensor, an optical sensor, and/or any other IoT sensor known in the art. In the depicted embodiments, IoT sensor 150 is a standalone device. Alternatively, IoT sensor 150 can execute anywhere within distributed data processing environment 100 as long as IoT sensor 150 can communicate with server computer 120, contamination detection component 112, IoT device 140, and/or computing device 110, via network 130. In various embodiments, not depicted in FIG. 1, distributed data processing environment 100 can comprise a plurality of IoT sensor 150.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106 and local storage 104. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 3.

In various embodiments, camera component 108 is executed on computing device 110. In some embodiments, camera component 108 can be located and/or executed anywhere within distributed data processing environment 100. Camera component 108 can be one or more cameras that are known in the art. In various embodiments, camera component 108 can provide live video feeds (video feed) of what the user is viewing to computing device 110 or more specifically contamination detection component 112. In various embodiments, contamination detection component 112 can enable computing device 110 to store the captured video feed and/or photographs to shared storage 124 and/or local storage 104. In various embodiments, camera component 108 is capable of recording, transmitting, and storing live or recorded videos and capable of taking, transmitting, and storing photographs.

User interface (interface) 106 provides an interface to predictive contamination detection component 112. Computing device 110, via user interface 106, can enable a user and/or a client to interact with contamination detection component 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Each of shared storage 124 and local storage 104 can be a data/knowledge repository and/or a database that can be written and/or read by one or a combination of contamination detection component 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house physical event data, and/or data shared throughout distributed data processing environment 100.

In various embodiments, contamination detection component 112 is executed on server computer 120. Alternatively, contamination detection component 112 can be executed on computing device 110. In some embodiments, contamination detection component 112 can be located and/or executed anywhere within distributed data processing environment 100. In various embodiments, contamination detection component 112 can be connected to and communicate with computing device 110 and/or server computer 120. In various embodiments, contamination detection component 112 can store capture user data and contamination propagation patterns on local storage 104 and/or shared storage 124. In the depicted embodiments, contamination detection component 112 comprises augmented reality component 114 and path module component 116. In the depicted embodiment, augmented reality component 114 and path module component 116 each execute on contamination detection component 112. In some embodiments of the present invention, augmented reality component 114 and path module component 116 can each be located and/or executed anywhere within distributed data processing environment 100 as long as augmented reality component 114 and path module component 116 can communicate with contamination detection component 112, computing device 110, and/or server computer 120.

In various embodiments of the present invention, contamination detection component 112 can connect to and communicate with a plurality if IoT devices (e.g., IoT device 140) and a plurality of IoT sensors (e.g., IoT sensor 150), via network 130. In various embodiments of the present invention, contamination detection component 112 can collect and/or retrieve data captured from IoT device 140 and IoT sensor 150. In some embodiments of the present invention, contamination detection component 112 collects a user's activity as the user interacts with IoT device 140 and IoT sensor 150. For example, a camera can record a user in a research lab and IoT devices (smart sink and other smart equipment) can log how a user interacts with equipment in the lab. In various embodiments of the present invention, contamination detection component 112 can recognize a specific user as the user enters a designated space, via an IoT camera and facial recognition. Alternatively, users can be assigned badges or access cards that have unique identification (ID) numbers associated with each user. In various embodiments of the present invention, contamination detection component 112 enable IoT device 140 and IoT sensor 150 to capture a user's activity pattern over a period of time in a designated area and in different contextual situations and create a learned user activity pattern for each contextual situation based on historically captured user activity patterns. An activity pattern can be how a user moves and/or interacts within a designated area and/or interacts with objects in a designated area.

In various embodiments of the present invention, contamination detection component 112 can instruct IoT device 140 and IoT sensor 150 to capture a user's interaction with different objects in a designated area (e.g., touching and/or holding beakers or test tubes in a laboratory). In various embodiments of the present invention, contamination detection component 112 can determine a user's activity pattern by retrieving and analyzing the captured user interactions from IoT device 140 and IoT sensor 150. The contextual situation can vary from time to time, and so the activity pattern (e.g., sequence of touching objects) can vary based on the contextual situation. For example, while cooking, context can be what objects will be touched and/or what objects needed to be touched and while entering into the kitchen which objects have been touched.

In various embodiments of the present invention, contamination detection component 112, via machine learning, can create a knowledge corpus based on the historically gathered data on the user's activity pattern in a designated area (i.e., learned user activity pattern), the sequence of touching various objects, contextual situation, and recognition of the user. The knowledge corpus can predict, based on the contextual situation, how a user will interact with objects within a designated area (e.g., how the user will move around in the designated area, what objects will be touched, time intervals between touching various objects, and/or any other way a user might interact with objects that is known in the art). In various embodiments of the present invention, based on the identified sequence of touching, contamination detection component 112 can identify how the contamination can spread from one object to another object in a designated area and contamination detection component 112 can determine the speed of the contamination spread.

In various embodiments, contamination detection component 112 can dynamically highlight or modify surfaces and/or objects based on user interaction and contamination risk. In various embodiments of the present invention, contamination detection component 112, via augmented reality component 114, can geofence augmented reality objects to specific surfaces, micro-locations and macro-locations based on where the object should be placed and the predefined ruleset for the object.

In various embodiments of the present invention, contamination containment component 112 can receive and process video feed from IoT device 140 (e.g., a camera). In this embodiment, contamination containment component 112 can identify a contamination event from the processed video feed. In the one particular embodiment contamination containment component 112 will integrate with a standard augmented reality Waypoint system and a spatial map (e.g., a 2-Dimensional map) of the designated area. Each contamination event will be marked on the map and generate a "block" on the map. In this embodiment, contamination containment component 112 will ingest the overall map and plot a new path if available around the contamination event. In this embodiment, contamination containment component 112 will also apply a decay logic on each contamination event based on the severity of the event (e.g., cough=5 minute block, sneeze=10 minute block, etc.). (Note: the term "WAYPOINT" may be subject to trademark rights in various jurisdictions throughout the world and are used here only in reference to the products or services properly denominated by the marks to the extent that such trademark rights may exist.)

In various embodiments of the present invention, contamination containment component 112 can use a sensitivity algorithm to generate a risk score for a specific location within a designated area, wherein the risk score is utilized by contamination containment component 112 to generate and display an augmented reality navigation path for a user.

Sensitivity Algorithm, consists of:

Risk score of specific location=distance from contamination incident or user*contaminant coefficient*degradation coefficient. For example:

Contamination incident=Cough, sneeze, or walking contaminated person;

Contaminant coefficient=value 0-1(lower numbers are less contamination (breathing vs sneezing) affected by contaminant, and other similar infectivity values);

Degradation coefficient: score 0-1(affected by time, surface material, location (Inside versus outside)).

In a more particular example, a user sneezed in a path 5 minutes ago, the sensitivity algorithm will calculate and output 1*0.9*0.7=0.63 (strong contamination). In another example, a user coughed next to the path 15 minutes ago the sensitivity algorithm will calculate and output 0.7*0.5*0.5=0.17 (low contamination risk).

Some sample values comprise:
Distance
Within 1 foot=1
1 to 3 feet=0.7
3 to 6 feet=0.5
Some contamination coefficients comprise:
Spitting=1
Sneezing=0.9
Coughing=0.5
Walking=0.3
Some degradation coefficients comprise:
within 5 mins=1
within 15 mins=0.8
within 30 mins=0.5

In one example, there are no optimal paths around the contamination. In this particular example, contamination containment component 112 has to go into the micro scale of pathing and instead of macro-pathing. Macro-pathing represents larger pathways (e.g., main hallway). While, Micro-pathing is generating radiuses around each object in a designated area. In this example, contamination containment component 112 ingests these radiuses, places augmented reality orbs around each object in a designated area and generates a path for the user around the generated orbs. In various embodiments of the present invention, if a user interacts (walks into and/or touches) with the orbs or paths, the contamination containment component 112 can modify the current waypoint and inject a higher priority task to a containment zone.

In various embodiments of the present invention, a user can predefine the entry point from where contaminant can spread (e.g., entering through the entry door). In one example, if a user enters a designated area through an entry point contamination detection component 112 does not validate if the user is contaminated; however, contamination detection component 112 does consider that the user could potentially be contaminated or potentially tracking contaminations through the user's clothes, shoes, and/or hands. In various embodiments of the present invention, contamination detection component 112 can use IoT device 140 (e.g., camera) and IoT sensor 150 (e.g., pressure sensors) to track if the user is entering a designated area from an entry point of contamination (e.g., entering a sterile room from an unsterile room). In various embodiments of the present invention, contamination detection component 112 can utilize IoT device 140 and IoT sensor 150 to identify if the user has taken any containment steps before entering a designated area and/or after exiting an entry point of the contaminated designated area.

In various embodiments of the present invention, if contamination detection component 112 identifies that the user has not performed any containment steps then contamination detection component 112 can track a user's activity pattern such as footsteps and objects a user touches, via IoT device 140 and IoT sensor 150 (e.g., pressure sensors). In various embodiments of the present invention, contamination detection component 112 can identify the user's footsteps and objects the user has touch as contaminated. In various embodiments of the present invention, contamination detection component 112 can notify and activate a contamination containment system (e.g., IoT containment device) to contain the contamination propagation and to decontaminate the contaminated objects or areas. For example, if contamination detection component 112 identifies that the user has a contaminant on the bottom of the users shoes and is tracking the contaminant through the designated area with each step then contamination detection component 112 alerts the user to stop walking and return to the entry point and activates a smart vacuum to contain the contamination.

In different example, the contamination containment system can use an infrared decontamination system to decontaminate an object or area to contain the contamination. In various embodiments of the present invention, contamination detection component 112 generate and display an augmented reality visual of the contamination to the user through computing device 110 (e.g., augmented reality glasses) that virtual shows the user which objects are contaminated by the user or other users. In various embodiments of the present invention, the generated and displayed augmented reality visual of the contaminated objects and areas in a designated area can be overlaid on top of the physical designated area. In various embodiments of the present invention, the generated and displayed augmented reality visual can highlight and/or annotate the objects and/or areas that are contaminated.

In various embodiments of the present invention, if contamination detection component 112 identifies that a user has not taken any containment steps after being notified then contamination detection component 112 can identify and label the objects and areas that become contaminated by the user. In various embodiments of the present invention, contamination detection component 112, via augmented reality component 114, can annotate (e.g., highlight) the areas and/or objects that are already contaminated so a user can avoid the contaminated areas and/or objects. In various embodiments of the present invention, contamination detection component 112 can issue multiple notifications a user if the user does not take containment steps within a predetermined time from the first notification. In various embodiments of the present invention, contamination detection component 112 can activate a contamination containment system if the user does not take containment steps within a predetermined amount of time.

In various embodiments of the present invention, contamination detection component, via path module component 116 can we build a safe path for the user to get from location A to B. In various embodiments of the present invention, when a user interacts with a contaminated area, contamination containment component 114, via path module component 116, can direct the user to a decontamination area by generating an augmented reality path towards a decontamination area and displaying the generated path to the user on computing device 110. Alternatively, In various embodiments of the present invention, contamination detection component, via augmented reality component 114 and path module component 116, can generate and display augmented reality path to user, via computing device 110, that directs the user away from contaminated objects and/or areas.

In one example, in a food processing factory there is potential risk for contamination and/or cross-contamination through the touching and handling of equipment and products. The augmented reality glasses enable a user to visually see which surfaces and/or objects are contaminated and should not be touched. In this particular example, contamination containment component 112 can identify and record (i.e., store) pre-defined contaminated zones such as biowaste disposal, contaminated rooms, and trashcans. In this example, contamination containment component 112 can ingest the pre-defined contamination zones and label them as default contaminated objects or areas. Even when no contamination is captured, contamination containment component 112 assumes any object or person leaving the default contaminated areas are contaminated.

In this example, a participant in a food processing factory is wearing an augmented reality headset and is attempting to prevent cross contamination. In this example, contamination containment component 112, via augmented reality component 114, is constantly running image recognition and video feed processing every second that the participant traverses a path. If a trashcan, doorknob, or contaminated object is recognized, then contamination containment component 112, via augmented reality component 114, will use known distance estimation and measuring capabilities to generate a radius of 1 foot around the contaminated area or object. Additionally, in this example, contamination containment component 112, via augmented reality component 114 and pathing module component 116, overlay a red highlight, on the ground in the viewport of the augmented reality glasses of where the participant should not walk and a display a green highlight on the ground of where the participant should walk. This pathing process will ensure the participant does not accidentally walk too close and touch something that could be contaminated.

In another example, if contamination containment component 112, via augmented reality component 114, identifies the user has already touched the contaminated place or object, contamination containment component 112, via augmented reality component 114, will display that a contamination containment step needs to be applied. Additionally, in this example contamination containment component 112, via augmented reality component 114, displays a prioritized list of what objects or areas should undergo contamination containment.

In another example, contamination containment component 112, via augmented reality component 114 and pathing module component 116, captures a user's path into a contaminant area and generates a path to lead the user out of the contaminated area and into a designated decontamination area based on what the AR device captures. In this example, a participant in a food processing factor touching a contaminated machine, in which contamination containment component 112, via augmented reality component 114, will lead the user to a handwash station and/or sanitation supply closet.

Figure 2:
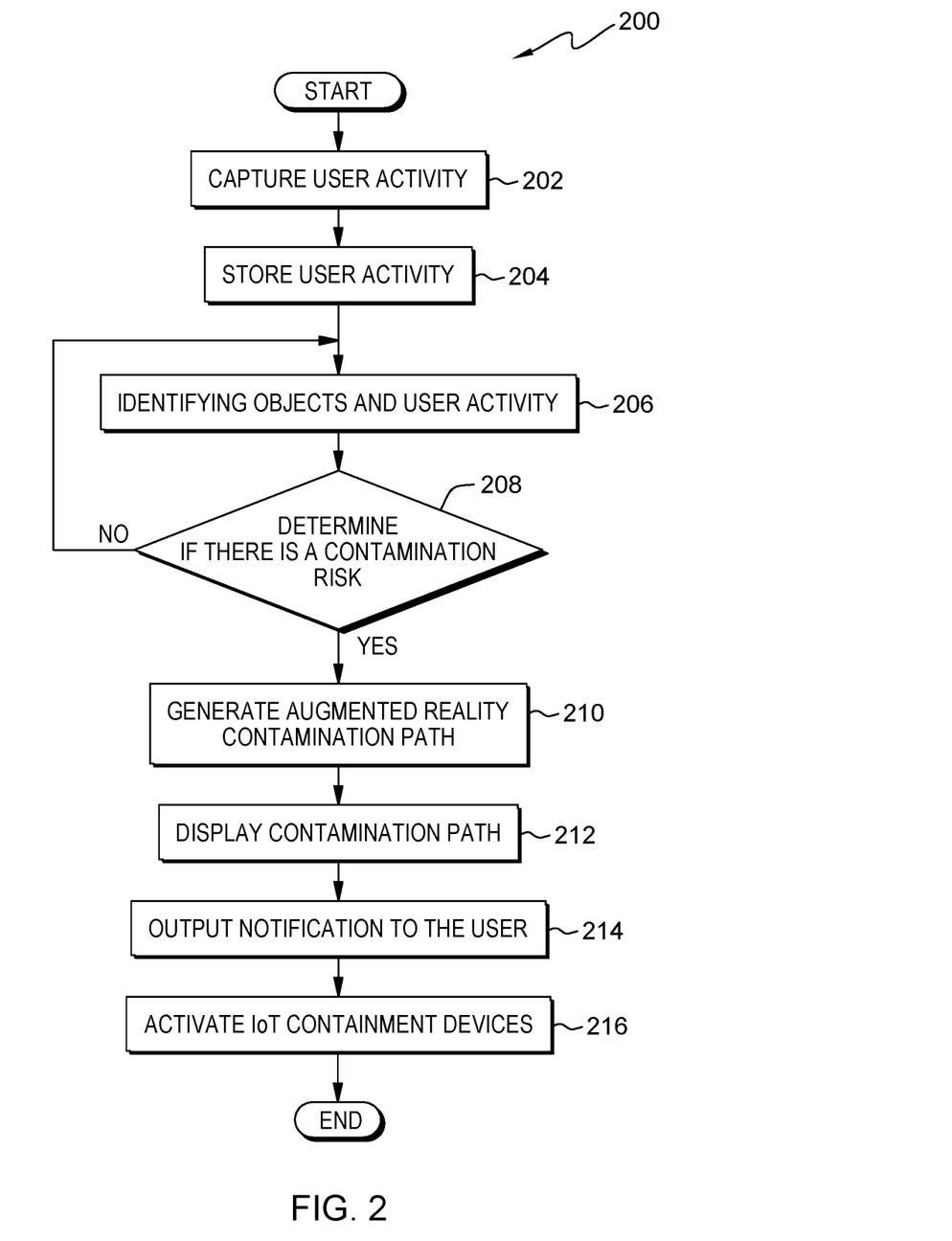
FIG. 2 illustrates operational steps of a contamination detection component, in communication a computing device within the distributed data processing environment of FIG. 1, for identifying and containing contaminants using IoT devices, in accordance with an embodiment of the present invention.

FIG. 2 illustrates operational steps of contamination detection component 112, generally designated 200, in communication with computing device 110, within distributed data processing environment 100 of FIG. 1, for identifying and containing contaminants using IoT devices, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, contamination detection component 112 captures a user's activity. In various embodiments of the present invention, contamination detection component 112 can receive captured user activity from IoT device 140 (e.g., a camera), IoT sensor 150, and/or computing device 110, via camera component 108 (e.g., augmented reality glasses), collectively referred to as collected user activity data. In various embodiments of the present invention, contamination detection component 112 can process the received captured user activity and identify user activity patterns and identify contamination events.

In step 204, contamination detection component 112 stores the captured user activity. In various embodiments of the present invention, contamination detection component 112 can store the received and processed user activity data on local storage 104 and/or shared storage 124. In some embodiments of the present invention, contamination detection component 112 can create a user profile based on the collected user activity data to create learned user activity patterns.

In step 208, contamination detection component 112 identifies objects in a designated area and user activity using IoT device 140 and IoT sensor 150. In various embodiments of the present invention, contamination detection component 112 can identify objects, surfaces, areas, and user activity in a designated area. In various embodiments of the present invention, contamination detection component 112 can identify and monitor how a user interacts with objects, surfaces, and areas in a designated area, via a camera (e.g., camera component 108 and/or IoT device 140) and IoT sensor 150. In various embodiments of the present invention, contamination detection component 112 receive input information that designates pre-defined contaminated zones. In various embodiments of the present invention, contamination detection component 112 can monitor user activity around the pre-defined contaminated zones.

In step 210, contamination detection component 112 determines if there is a contamination risk. In various embodiments of the present invention, if contamination detection component 112 determines there is a contamination risk (Yes Step) then contamination detection component 112 can track a user's activity and the contamination propagation. In various embodiments of the present invention, if contamination detection component 112 determines there is no contamination risk (No Step) then contamination detection component 112 can continue to identify and track a user's activity.

In step 212, contamination detection component 112 generates an augmented reality contamination path based on the tracked user's activity and tracked contamination propagation. In various embodiments of the present invention, contamination detection component 112 can generate an overlay of the identified and tracked contaminated objects, and/or areas. For example, contamination detection component 112, via pathing module component 116, returns the currently identified contaminated objects and/or areas to computing device 110 (e.g., augmented reality glasses). In this example, contamination detection component 112, via augmented reality component 114, generates a one-foot highlighted radius around the identified contaminated objects and contaminated areas.

In various embodiments of the present invention, contamination detection component 112 can receive and process a waypoint store/waypoint system and a spatial map of the designated area. In various embodiments of the present invention, contamination detection component 112, via augmented reality component 114 and pathing module component 116, can integrate the learned user activity pattern and the user's known schedule (e.g., work schedule) with the waypoint store and spatial map. In various embodiments of the present invention, contamination detection component 112, via augmented reality component 114, outputs an un-adjusted path (i.e., a path that does not account for identified contamination). In various embodiments of the present invention, contamination detection component 112, via augmented reality component 114, can integrate the identified contaminated objects and contaminated areas (from step 206) with the un-adjusted path to generate an adjusted path that can navigate a user around the contaminated objects and contaminated areas. In various embodiments of the present invention, the generated augmented reality contamination path (i.e., adjusted path) can consist of a path of contamination (e.g., identified contaminated objects and/or contaminated areas) and a navigation path for the user that guides the user around the contaminated objects and/or contaminated areas in a designated area.

In step 214, contamination detection component 112 virtually displays the generated augmented reality contamination path. In various embodiments of the present invention, contamination detection component 112, via augmented reality component 114, can virtually displays the generated augmented reality contamination path on computing device 110 (e.g., augmented reality glasses).

In step 216, contamination detection component 112 outputs a notification to the user. In various embodiments of the present invention, contamination detection component 112 can output a notification to a user that can be displayed on computing device 110.

In step 218, contamination detection component 112 activates an IoT containment device. In various embodiments of the present invention, contamination detection component 112 can activate a one or more IoT containment devices to contain the contamination. In various embodiments of the present invention, contamination detection component 112 can direct the one or more IoT containment devices to contain the contamination using IoT device 140, IoT sensor 150, and the generated contamination path.

Figure 3:
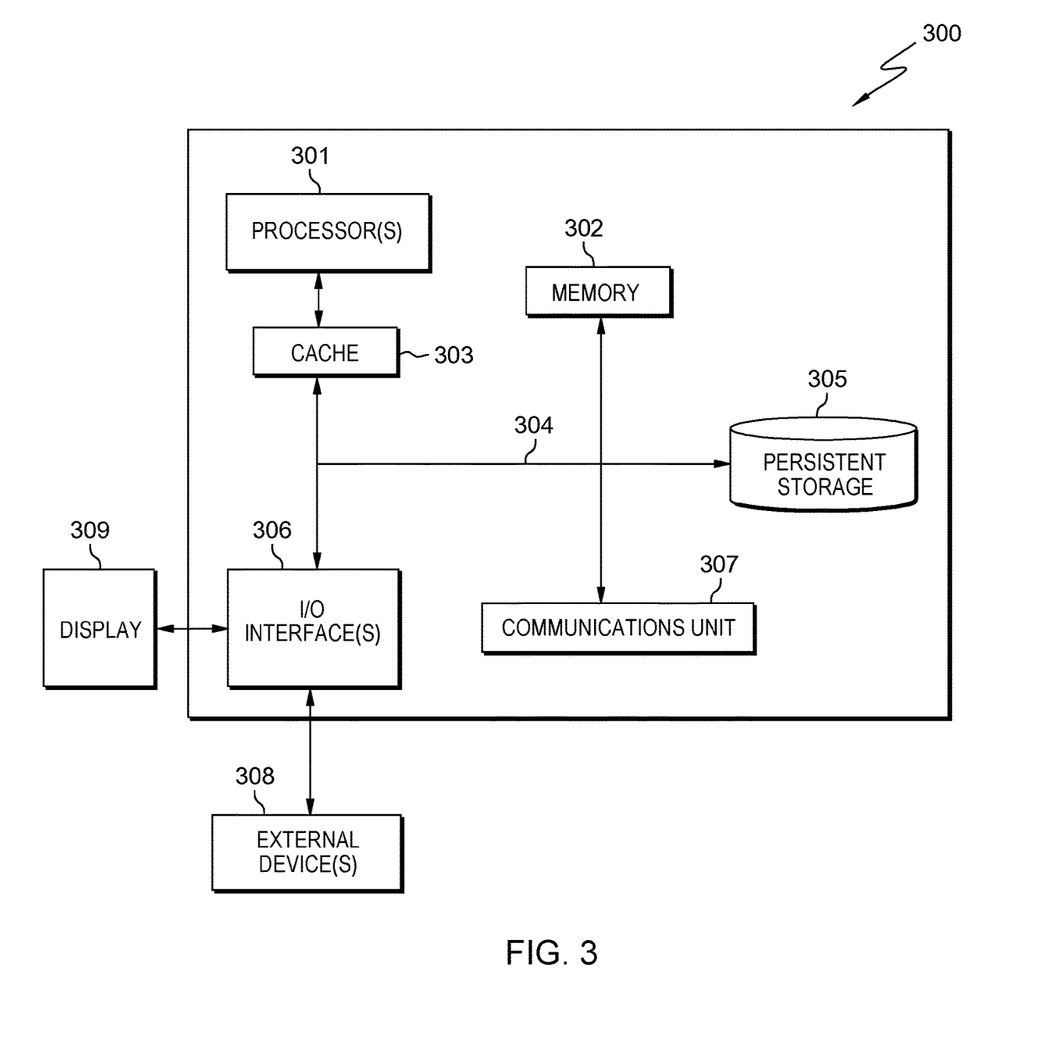
FIG. 3 depicts a block diagram of components of a computing device executing the contamination detection component within the distributed data processing environment of FIG. 1, in accordance with an embodiment of the present invention.

FIG. 3 depicts computer system 300, where computing device 110 represents an example of computer system 300 that includes contamination detection component 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying and containing contaminants using one or more IoT devices, the method comprising:
    identifying objects and user activity in a designated area through a plurality of Internet of things (IoT) devices and a plurality of IoT sensors;
    determining a contamination risk in the designated area;
    generating a risk score for a specific location within the designated area;
    generating an augmented reality contamination path for the contamination risk based on the identified objects user activity in the designated area, and the risk score;
    identifying, based on one or more predefined rules, one or more contamination entry points in the designated area;
    displaying an augmented reality contamination path to a user on an augmented reality device; and
    activating an IoT containment device to contain the contamination risk.

2. The computer-implemented method of claim 1, further comprising:
    issuing a notification to the user through an IoT enabled device, wherein the notification is an alert executed on a speaker on the IoT enabled device.

3. The computer-implemented method of claim 1, wherein the user activity includes user-specific activity for a first user; and the computer-implemented method of claim 1 further comprises:
    collecting the user-specific activity in the designated area through the plurality of IoT devices and the plurality of IoT sensors; and
    creating a user profile for the first user of a user-specific activity pattern including the user-specific activity received from the plurality of IoT devices and the plurality of IoT sensors.

4. The computer-implemented method of claim 3, further comprising:
    learning a user's sequence for touching different objects in a contextual situation while interacting with the plurality of IoT devices and plurality of IoT sensors; and
    creating a knowledge corpus including the user-specific activity pattern in the designated area, the user's sequence for touching different objects in the contextual situation, and recognition data for the first user, wherein the knowledge corpus facilitates a contamination path prediction, based on the contextual situation, of how the first user will interact with objects within the designated area.

5. The computer-implemented method of claim 1, further comprising:

dynamically annotating surfaces and the objects in the designated area based on user interaction and contamination risk by geofencing augmented reality objects to the surfaces using micro-locations and macro-locations.

6. The computer-implemented method of claim 1, wherein generating the augmented reality contamination path for the contamination risk further comprises:
micro-pathing the contamination path, wherein micro-pathing generates radiuses around each identified object in the designated area.

7. The computer-implemented method of claim 6, wherein generating the augmented reality contamination path for the contamination risk further comprises:
ingesting the generated radiuses;
generating augmented reality orbs around each identified object in the designated area; and
generating the augmented reality contamination path around the generated orbs for the first user.

8. A computer program product for identifying and containing contaminants using one or more IoT devices, the computer program product comprising:
one or more computer readable storage devices and program instructions stored on the one or more computer readable storage devices, the stored program instructions comprising:
program instructions to identify objects and user activity in a designated area through a plurality of internet of things (IoT) devices and a plurality of IoT sensors;
program instructions to determine a contamination risk in the designated area;
program instructions to generate a risk score for a specific location within the designated area;
program instructions to generate an augmented reality contamination path for the contamination risk based on the identified objects user activity in the designated area, and risk score;
program instructions to identify, based on one or more predefined rules, one or more contamination entry points in the designated area;
program instructions to display an augmented reality contamination path to a user on an augmented reality device; and
program instructions to activate an IoT containment device to contain the contamination risk.

9. The computer program product of claim 8, further comprising:
program instructions to issue a notification to the user through an IoT enabled device, wherein the notification is an alert executed on a speaker on the IoT enabled device.

10. The computer program product of claim 8, wherein the user activity includes user-specific activity for a first user; and the computer program product of claim 8 further comprises:
program instructions to collect the user-specific activity in the designated area through the plurality of IoT devices and the plurality of IoT sensors; and
program instructions to create a user profile for the first user of a user-specific activity pattern including the user-specific activity received from the plurality of IoT devices and the plurality of IoT sensors.

11. The computer program product of claim 10, further comprising:

program instructions to learn a user's sequence for touching different objects in a contextual situation while interacting with the plurality of IoT devices and plurality of IoT sensors; and
program instructions to create a knowledge corpus including the user-specific activity pattern in the designated area, the user's sequence for touching different objects in the contextual situation, and recognition data for the first user, wherein the knowledge corpus facilitates a contamination path prediction, based on the contextual situation, of how the first user will interact with objects within the designated area.

12. The computer program product of claim 8, further comprising:
program instructions to dynamically annotate surfaces and the objects in the designated area based on user interaction and contamination risk by geofencing augmented reality objects to the surfaces using micro-locations and macro-locations.

13. The computer program product of claim 8, wherein generating the augmented reality contamination path for the contamination risk further comprises:
program instructions to micro-path the contamination path, wherein micro-pathing generates radiuses around each identified object in the designated area.

14. The computer program product of claim 13, wherein generating the augmented reality contamination path for the contamination risk further comprises:
program instructions to ingest the generated radiuses;
program instructions to generate augmented reality orbs around each identified object in the designated area; and
program instructions to generate the augmented reality contamination path around the generated orbs for the first user.

15. A computer system for identifying and containing contaminants using one or more IoT devices, the computer system comprising:
one or more computer processors;
one or more computer readable storage devices;
program instructions stored on the one or more computer readable storage devices for execution by at least one of the one or more computer processors, the stored program instructions comprising:
program instructions to identify objects and user activity in a designated area through a plurality of internet of things (IoT) devices and a plurality of IoT sensors;
program instructions to determine a contamination risk in the designated area;
program instructions to generate a risk score for a specific location within the designated area;
program instructions to generate an augmented reality contamination path for the contamination risk based on the identified objects user activity in the designated area, and risk score;
program instructions to identify, based on one or more predefined rules, one or more contamination entry points in the designated area;
program instructions to display an augmented reality contamination path to a user on an augmented reality device; and
program instructions to activate an IoT containment device to contain the contamination risk.

16. The computer system of claim 15, further comprising:
program instructions to issue a notification to the user through an IoT enabled device, wherein the notification is an alert executed on a speaker on the IoT enabled device.

17. The computer system of claim 15, wherein the user activity includes user-specific activity for a first user; and the computer system of claim 15 further comprises:
program instructions to collect the user-specific activity in the designated area through the plurality of IoT devices and the plurality of IoT sensors; and
program instructions to create a user profile for the first user of a user-specific activity pattern including the user-specific activity received from the plurality of IoT devices and the plurality of IoT sensors.

18. The computer system of claim 17, further comprising:
program instructions to learn a user's sequence for touching different objects in a contextual situation while interacting with the plurality of IoT devices and plurality of IoT sensors; and
program instructions to create a knowledge corpus including the user-specific activity pattern in the designated area, the user's sequence for touching different objects in the contextual situation, and recognition data for the first user, wherein the knowledge corpus facilitates a contamination path prediction, based on the contextual situation, of how the first user will interact with objects within the designated area.

19. The computer system of claim 15, further comprising:
program instructions to dynamically annotate surfaces and the objects in the designated area based on user interaction and contamination risk by geofencing augmented reality objects to the surfaces using micro-locations and macro-locations.

20. The computer system of claim 15, wherein generating the augmented reality contamination path for the contamination risk further comprises:
program instructions to micro-path the contamination path, wherein micro-pathing generates radiuses around each identified object in the designated area;
program instructions to ingest the generated radiuses;
program instructions to generate augmented reality orbs around each identified object in the designated area; and
program instructions to generate the augmented reality contamination path around the generated orbs for the first user.

* * * * *